United States Patent [19]

Vogel et al.

[11] 4,417,038
[45] Nov. 22, 1983

[54] ETHYLENE-ALKYNE COPOLYMERS, THEIR PREPARATION AND THEIR USE AS ADDITIVES TO PETROLEUM DISTILLATES

[75] Inventors: Hans-Henning Vogel, Frankenthal; Manfred Schramm, Viernheim; Michael Werner, Mannheim; Erich Schwartz, Ludwigshafen, all of Fed. Rep. of Germany

[73] Assignee: BASF Aktiengesellschaft, Fed. Rep. of Germany

[21] Appl. No.: 327,727

[22] Filed: Dec. 4, 1981

[30] Foreign Application Priority Data

Dec. 12, 1980 [DE] Fed. Rep. of Germany ....... 3046802

[51] Int. Cl.³ .................... C08F 210/02; C08F 238/00
[52] U.S. Cl. ................................ 526/285; 252/52 R; 252/54.6; 252/52 A
[58] Field of Search ........................................ 526/285

[56] References Cited

U.S. PATENT DOCUMENTS

| | | | |
|---|---|---|---|
| 2,192,931 | 3/1940 | Paton et al. | 526/285 |
| 2,461,990 | 2/1949 | Lichty | 526/285 |
| 2,898,327 | 8/1959 | McCulloch et al. | 526/285 |
| 3,159,608 | 12/1964 | Ilnyckyj | 260/87.3 |
| 3,271,378 | 9/1966 | Daniels | 526/285 |
| 3,389,979 | 6/1968 | Brownawell et al. | 44/62 |
| 3,567,639 | 3/1971 | Aaron et al. | 252/56 |
| 4,048,411 | 9/1977 | Mietzner et al. | 526/64 |
| 4,074,040 | 2/1978 | Oeder et al. | 526/352 |
| 4,076,919 | 2/1978 | Urban et al. | 526/64 |
| 4,087,601 | 5/1978 | Pfleger et al. | 526/329 |
| 4,093,795 | 6/1978 | Buechner et al. | 528/481 |
| 4,169,929 | 10/1979 | Buechner et al. | 526/352.2 |
| 4,217,431 | 8/1980 | Zacher et al. | 526/68 |

Primary Examiner—Harry Wong, Jr.
Attorney, Agent, or Firm—Keil & Witherspoon

[57] ABSTRACT

Ethylene-alkyne copolymers and ethylene-alkyne-alkene terpolymers. The copolymers and terpolymers have a number-average molecular weight, determined by vapor phase osmometry, of from 500 to 500,000 and contain, as copolymerized units,
(A) from 70 to 99 percent by weight of ethylene and
(B) an acetylenically unsaturated compound of the formula (I)

$$H-C\equiv C-R^1 \qquad I$$

where $R^1$ is $(OCH_2CH_2)_nH$ or $CH_2-R^2$, n is 1-20, $R^2$ is -OH, -OCOR³ or -COOR³ and $R^3$ is straight-chain or branched $C_1$-$C_{10}$-alkyl. The terpolymers contain, as copolymerized units, from 50 to 99 percent by weight of (A), from 0.5 to 30 percent by weight of (B) and, in addition, (C) from 0.5 to 49.5 percent by weight of an olefinically unsaturated ester of the formula (II)

$$CH_2=C\begin{matrix}R^4\\|\\R^5\end{matrix} \qquad II$$

where $R^4$ is H or $CH_3$, $R^5$ is $-OOC-R^6$ or $-COOR^6$ and $R^6$ is straight-chain or branched $C_1$-$C_{10}$-alkyl. The copolymers and terpolymers are prepared in a continuous or batchwise polymerization system at from 150° to 350° C. under a pressure of from 500 to 3,000 bar in the presence of from 200 to 4,000 mole ppm, based on monomers, of an organic peroxide which decomposes into free radicals. The copolymers and terpolymers can be used as additives to petroleum distillates.

4 Claims, No Drawings

ETHYLENE-ALKYNE COPOLYMERS, THEIR PREPARATION AND THEIR USE AS ADDITIVES TO PETROLEUM DISTILLATES

The present invention relates to ethylene-alkyne copolymers and ethylene-alkyne-alkene terpolymers, their preparation and their use as additives to petroleum distillates.

Copolymers for the above purpose require on the one hand to be very effective in improving the low-temperature properties of petroleum distillates whilst on the other hand they must be obtainable by a sufficiently simple process.

It is known that these requirements can be met by using, as additives to the petroleum distillates, copolymers of ethylene with vinylcarboxylic acid esters, these copolymers having number-average molecular weights of less than 3,000 (cf., for example, U.S. Pat. Nos. 3,567,639, 3,389,979 and 3,159,608).

However, the ethylene/vinylcarboxylic acid ester copolymers and terpolymers conventionally used in petroleum distillates have the disadvantage that they are not equally effective in all petroleum distillates. Rather, the effect of the conventional additives depends, inter alia, greatly on the origin of the crude oil from which the distillate is derived, on the method of processing of the crude oil and on the nature and amount of n-paraffin hydrocarbons in the petroleum distillate, i.e., for example, on the boiling range or boiling point of the distillate.

It is an object of the present invention to provide ethylene-alkyne copolymers and ethylene-alkyne-alkene terpolymers.

It is a further object of the present invention to provide a simple process for the preparation of such copolymers and terpolymers.

It is yet a further object of the present invention to provide novel polymers which are very effective in improving the low-temperature properties of petroleum distillates without suffering from the disadvantages described at the outset.

We have found that these objects are achieved, according to the invention, by ethylene-alkyne copolymers which have a number-average molecular weight, determined by vapor phase osmometry, of from 500 to 500,000, preferably from 500 to 10,000, especially from 1,000 to 5,000, and which contain, as copolymerized units, (A) from 70 to 99 percent by weight of ethylene, based on copolymer, and (B) an acetylenically unsaturated compound of the general formula (I)

   I where $R^1$ is $(OCH_2CH_2)_nH$ or $CH_2-R^2$, n is 1–20, $R^2$ is $-OH$, $-OCOR^3$ or $-COOR^3$ and $R^3$ is straight-chain or branched $C_1-C_{10}$-alkyl.

Preferred copolymers are ternary ethylene-alkyne-alkene copolymers which contain, as copolymerized units, from 50 to 99 percent by weight of (A), from 0.5 to 30 percent by weight of (B) and, in addition, (C) from 0.5 to 49.5 percent by weight of an olefinically unsaturated ester of the general formula (II)

where $R^4$ is H or $CH_3$, $R^5$ is $-OOC-R^6$ or $-COOR^6$ and $R^6$ is straight-chain or branched $C_1-C_{10}$-alkyl or hydrogen, the sum of the percentages by weight of (A), (B) and (C) is 100.

Further, we have found that another object of the invention is achieved by a process for the preparation of the ethylene-alkyne copolymers described at the outset, wherein the copolymerization of ethylene with an acetylenically unsaturated compound of the general formula I, with or without an olefinically unsaturated ester of the general formula II, is carried out in a continuous or batchwise polymerization system at from 150° to 350° C. under a pressure of from 500 to 3,000 bar in the presence of from 200 to 4,000 mole ppm, based on monomers, of an organic peroxide which decomposes into free radicals, in the presence or absence of oxygen and in the presence or absence of a polymerization regulator.

The novel ethylene-alkyne copolymers and ethylene-alkyne-alkene terpolymers are solid or waxy substances (depending on the molecular weight), which still contain double bonds. The copolymers have a number-average molecular weight, determined by vapor phase osmometry, of from 500 to 500,000, preferably from 500 to 10,000. Copolymers with average molecular weights of from 1,000 to 5,000 are particularly suitable for use in petroleum distillates.

The copolymers according to the invention contain from 70 to 99 percent by weight of ethylene, based on copolymer, together with an acetylenically unsaturated compound of the general formula $H-C\equiv C-R^1$ (I), where $R^1$ is $H(OCH_2CH_2)_n$ or $CH_2-R^2$, n is 1–20, $R^2$ is $-OH$, $-OCOR^3$ or $-COOR^3$ and $R^3$ is straight-chain or branched $C_1-C_{10}$-alkyl. Examples of the unsaturated compound of the formula I are prop-1-ynyl acetate, prop-1-ynol, methoxybut-1-yne and acetylene, amongst which the first-mentioned is particularly suitable.

The content of the acetylenically unsaturated compound (I) in the copolymer is from 0.5 to 30 percent by weight, based on copolymer.

Preferred copolymers are terpolymers which contain, as copolymerized units, 65–98 percent by weight of ethylene, 1–20 percent by weight of the acetylenically unsaturated compound (I) and 1–34 percent by weight of a third component, namely an olefinically unsaturated ester of the general formula (II)

where $R^4$ is H or $CH_3$, $R^5$ is $OOC-R^6$ or $COOR^6$ and $R^6$ is straight-chain or branched $C_1-C_{10}$-alkyl or hydrogen, and the sum of the percentages by weight of (A), (B) and (C) is 100. Examples of the olefinically unsaturated compound of the formula (II) are vinyl esters, e.g. vinyl acetate, and acrylic acid esters, e.g. ethylhexyl acrylate and n-butyl acrylate. Vinyl acetate is particularly suitable as the third comonomer. Especially preferred terpolymers are those which contain, as copolymerized units, from 75 to 80 percent by weight of ethylene, from 3 to 15 percent by weight of compound (I) and from 5 to 22 percent by weight of compound (II).

The said copolymers and terpolymers may contain from 0.01 to 10, especially from 0.05 to 5, percent by weight, based on polymer, of monomers (I) and/or (II) which have not been converted during the polymerization or have been added subsequent to completion of the polymerization.

The ethylene-alkyne copolymers or terpolymers are prepared by copolymerizing ethylene with an acetylenically unsaturated compound of the general formula (I), with or without an unsaturated ester of the general formula (II), in a continuous or batchwise polymerization system at from 150° to 350° C., under a pressure of from 500 to 3,000 bar, in the presence of an organic peroxide which decomposes into free radicals, and in the presence or absence of oxygen and the presence or absence of a polymerization regulator.

Such polymerization processes are well known and are described, for example, in Ullmanns Enzyklopädie der Technischen Chemie, 3rd edition, Volume 14, pages 137–148. The conditions required in the polymerization zone can advantageously be obtained by employing tubular reactors and/or autoclave reactors. For the purposes of the invention, tubular reactors are tubular polymerization vessels whose length is from 10,000 to 40,000 times the diameter of the circular-section tube. In autoclave reactors, whose inner space generally has a ratio of height to diameter of the circular cross-section of from 1:1 to 20:1, the reaction mixture is agitated by means of stirrers. Methods of copolymerizing ethylene with copolymerizable compounds to give binary or ternary copolymers in the presence of organic peroxides which decompose into free radicals, or in the presence of oxygen, are described, for example, in the relatively recent U.S. Pat. Nos. 4,048,411, 4,093,795, 4,076,919, 4,217,431, 4,169,929, 4,087,601 and 4,074,040.

In contrast to the known processes, the process according to the invention entails copolymerization in the presence of relatively large amounts of peroxide, namely from 200 to 4,000, preferably from 400 to 3,000, more especially from 800 to 3,000, mole ppm, based on monomers. tert.-Butyl perisononanate is a particularly suitable peroxide.

The novel ethylene copolymers are used, in an amount of from 0.001 to 2 percent by weight, as an additive to petroleum distillates of boiling range from 120 to 400° C., in order to improve the flow and/or to lower the pour point and the cold filter plugging point as defined in DIN 51,428. Moreover they are used, in an amount of from 0.001 to 2 percent by weight, as an additive for lowering the setting point of petroleum distillates (neutral oils) which have a boiling range of about 400° C., have been obtained by conventional methods, for example by vacuum distillation, and serve as starting materials for the preparation of lubricants. Mixtures of the novel ethylene copolymers are used as an additive to petroleum distillates which have been obtained by vacuum distillation and serve as starting materials for the preparation of lubricating oils, the additives being intended to improve the low-temperature properties (setting point and pour point and/or cold filter plugging point). The novel copolymers and terpolymers, prepared according to the invention, may contain small amounts of relatively high molecular weight polymerization products which can be kept in solution, advantageously by the measures described in German Laid-Open application DOS No. 2,832,738, when using the copolymers and terpolymers as additives to petroleum distillates. For the said use, it is advantageous if the polymers contain small amounts of residual comonomers, in order to prevent premature precipitation of the relatively high molecular weight polymerization products. For this purpose, the comonomers can also be added subsequently, individually or as a mixture, in amounts of from 0.5 to 5 percent by volume, based on the ethylene copolymer or terpolymer.

The Preparation Examples which follow illustrate the invention.

EXAMPLES

All experiments were carried out in a continuously operated stirred autoclave of 1 liter internal volume. In all experiments, the reaction pressure was 1,500 bar and the reaction temperature, adjusted by control of the continous feed rate of peroxide, was 240° C. The ethylene throughput was from 400 to 550 moles/h. In all cases, t-butyl perisononanate was used as the initiator. The stated concentrations of peroxide are molar concentrations based on monomer. The molecular weight of the polymer was regulated by the conventional method, using conventional amounts of propionaldehyde as the regulator, and was determined in terms of the melt viscosity, in mm$^2$/sec, at 120° C.

In the cas of the esters, the comonomer content was determined by saponification and titration of the excess alkali. In the case of the alcohol the content of polymer was calculated from the total oxygen, with allowance for appropriate corrections found from comparative experiments.

The Examples are summarized in the Table which follows.

EXAMPLES

| No. | Type | Objective | Ethylene throughput (moles/h) | Comonomer Type | Feed rate (moles/h) | Peroxide consumption (ppm) | Viscosity (mm$^2$/sec) | Comonomer content (% by weight) |
|---|---|---|---|---|---|---|---|---|
| 1 | Example | Copolymerization | 500 | Propynyl acetate (I) | 10 | 830 | 120 | 10.3 |
| 2 | Comparison | Copolymerization | 400 | Vinyl acetate (II) | 9 | 65 | 210 | 9.8 |
| 3 | Comparison | Homopolymerization | 400 | — | — | 25 | 250 | — |
| 4 | Example | Terpolymerization | 480 | (I) and (II) | 28 / 7 | 2,700 | 200 | 15 / 6 |
| 5 | Comparison | Copolymerization | 430 | (II) | 20 | 47 | 180 | 20 |
| 6 | Example | Copolymerization | 540 | Prop-1-ynol | 9 | 1,300 | 190 | 3.5 |
| 7 | Example | Terpolymerization | 540 | Propynol (I) / Vinyl acetate (II) | 7.5 / 45 | 950 | 130 | 3.8 / 20.0 |

We claim:

1. An ethylene-alkyne copolymer, useful as an additive for petroleum distillates, which has a number-average molecular weight, determined by vapor phase osmometry, of from 500 to 500,000 and which contains, as copolymerized units,
(A) from 70 to 99% by weight of ethylene and
(B) an acetylenically unsaturated compound of the general formula (I)

$$H-C\equiv C-R^1 \qquad I$$

where $R^1$ is $(OCH_2CH_2)_nH$ or $CH_2-R^2$, n is 1-20, $R^2$ is $-OH$, $-OCOR^3$ or $-COOR^3$ and $R^3$ is a straight-chain or branched $C_1-C_{10}$-alkyl.

2. A process for the preparation of an ethylene-alkyne copolymer as in claim 1, wherein the copolymerization of ethylene with an acetylenically unsaturated compound of the formula I, is carried out in a continuous or batchwise polymerization system at from 150° to 350° C. under a pressure of from 500 to 3,000 bar in the presence of from 200 to 4,000 mole ppm, based on monomers, of an organic peroxide which decomposes into free radicals, in the presence or absence of oxygen and in the presence or absence of a polymerization regulator.

3. A copolymer as defined in claim 1, which has a number-average molecular weight of from 500 to 10,000.

4. A copolymer as defined in claim 1, which has a number-average molecular weight of from 1,000 to 5,000.

* * * * *